United States Patent
Melito et al.

(10) Patent No.: US 6,341,754 B1
(45) Date of Patent: Jan. 29, 2002

(54) SMALL APPLIANCE MODULAR HANGER SYSTEM

(75) Inventors: M. Anthony Melito; Paul F. Garneau, both of East Haven, CT (US)

(73) Assignee: HP Intellectual Corp., Wilmington, DE (US)

( * ) Notice: Subject to any disclaimer, the term of this patent is extended or adjusted under 35 U.S.C. 154(b) by 0 days.

(21) Appl. No.: 09/411,924

(22) Filed: Oct. 4, 1999

(51) Int. Cl.⁷ .......................... F16M 11/00; A47B 67/02
(52) U.S. Cl. ...................... 248/201; 248/317; 312/246
(58) Field of Search .............................. 248/201, 200.1, 248/235, 213.2, 229.1, 304, 317; 312/242, 245, 246

(56) References Cited

U.S. PATENT DOCUMENTS

| | | | |
|---|---|---|---|
| 1,898,835 A | 2/1933 | Henderson | |
| 2,885,694 A | * 5/1959 | Ulm | 5/308 |
| 3,143,214 A | * 8/1964 | Moore et al. | 211/26 |
| 3,554,142 A | * 1/1971 | Sorenson | 108/157.13 |
| 3,698,780 A | 10/1972 | Collins et al. | 312/245 |
| 4,133,507 A | 1/1979 | Chervenak | 248/225.2 |
| 4,165,852 A | 8/1979 | Chervenak | 248/225.2 |
| 4,313,043 A | 1/1982 | White et al. | 219/10.55 R |
| 4,453,690 A | 6/1984 | Takeuji | 248/309.1 |
| 4,457,436 A | 7/1984 | Kelley | 211/88 |
| 4,477,047 A | * 10/1984 | Pelczarski | 248/201 |
| 4,540,146 A | 9/1985 | Basile | 248/201 |
| 4,580,754 A | 4/1986 | Hughes | 248/285 |
| 4,580,853 A | 4/1986 | Hitzeroth et al. | 312/245 |
| 4,628,185 A | 12/1986 | Norwood et al. | 219/386 |
| 4,630,532 A | * 12/1986 | Sonnentag et al. | 99/279 |
| 4,635,615 A | 1/1987 | Itoh et al. | 126/273 A |
| 4,645,909 A | 2/1987 | Thoben et al. | 219/411 |
| 4,666,113 A | 5/1987 | Itoh et al. | 248/201 |
| 4,720,622 A | 1/1988 | Iwata et al. | 219/391 |
| 4,733,841 A | 3/1988 | Wilson | 248/222.1 |
| 4,753,406 A | * 6/1988 | Kodama et al. | 248/327 |
| 4,792,195 A | 12/1988 | Adriaansen et al. | 312/245 |
| 4,796,850 A | 1/1989 | Aramaki | 248/674 |
| 4,824,061 A | 4/1989 | Sumikama et al. | 248/225.2 |
| 4,826,115 A | 5/1989 | Novitski | 248/225.2 |
| 5,131,620 A | 7/1992 | Boundy | 248/674 |
| 5,190,153 A | 3/1993 | Schultz et al. | 206/309 |
| 5,333,827 A | 8/1994 | Gioscia | 248/289.1 |
| 5,388,793 A | 2/1995 | Kosten et al. | 248/201 |
| 5,467,954 A | * 11/1995 | Wekell | 248/201 |
| 5,484,125 A | 1/1996 | Anoszko | 248/201 |
| 5,676,440 A | 10/1997 | Garber et al. | 312/245 |
| 5,941,492 A | * 8/1999 | O'Neill | 248/317 |
| 6,056,378 A | * 5/2000 | Semon et al. | 312/246 |

* cited by examiner

*Primary Examiner*—Anita King
*Assistant Examiner*—Naschica S Morrison
(74) *Attorney, Agent, or Firm*—Barry E. Deutsch

(57) ABSTRACT

A system for connecting an appliance to a bottom surface of a kitchen cabinet, the system comprising at least two brackets and at least one mounting section connected to the appliance. The brackets are connectable to the bottom surface of the kitchen cabinet at any one of a number of different suitable spacing distances between the two brackets. The mounting section is connected to the appliance for mounting the appliance to the brackets. The mounting section is adapted to connect to the brackets when the brackets are at any one of the different suitable spacing distances.

24 Claims, 6 Drawing Sheets

SMALL APPLIANCE MODULAR HANGER SYSTEM

BACKGROUND OF THE INVENTION

1. Field of the Invention

The present invention relates to kitchen appliances and, more particularly, to a system for mounting a kitchen appliance to a bottom surface of a kitchen cabinet.

2. Prior Art

U.S. Pat. No. 4,540,146 discloses a mounting arrangement for connecting a kitchen appliance to a bottom surface of a kitchen cabinet. The system includes two brackets with rail-like horizontal hangers for connecting to lateral sides of the appliance. U.S. Pat. No. 5,388,793 discloses a support system for a kitchen appliance with a pair of brackets with ribs that connect to handle-like members on the lateral sides of the appliance. In the prior art, individual mounting brackets were designed and developed for a particular product. This resulted in many different bracket designs. It is an object of the present invention to provide a mounting system with a minimum number of different parts and which can be used with different products and hung at different intervals along a kitchen cabinet.

SUMMARY OF THE INVENTION

In accordance with one embodiment of the present invention, a system is provided for connecting an appliance to a bottom surface of a kitchen cabinet, the system comprising at least two brackets and at least one mounting section connected to the appliance. The brackets are connectable to the bottom surface of the kitchen cabinet at any one of a number of different suitable spacing distances between the two brackets. The mounting section is connected to the appliance for mounting the appliance to the brackets. The mounting section is adapted to connect to the brackets when the brackets are at any one of the different suitable spacing distances.

In accordance with another embodiment of the present invention, a kitchen appliance mounting bracket is provided comprising a first section for connecting the bracket to a kitchen cabinet; and a second section connected to the first section for connecting the bracket to an appliance. The second section comprises a locating system with two resiliently deflectable spring sections which are deflectable in opposite directions for snaplock connecting the second section to the appliance.

In accordance with another embodiment of the present invention, a kitchen appliance mounting bracket is provided comprising a first section for connecting the bracket to a first portion of an appliance; and a second section for connecting the bracket to a second portion of the appliance. The first and second sections are directly connected to each other or the bracket alternatively comprises at least one third section connecting the first section to the second section. A length of the bracket is configurable to a desired length.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
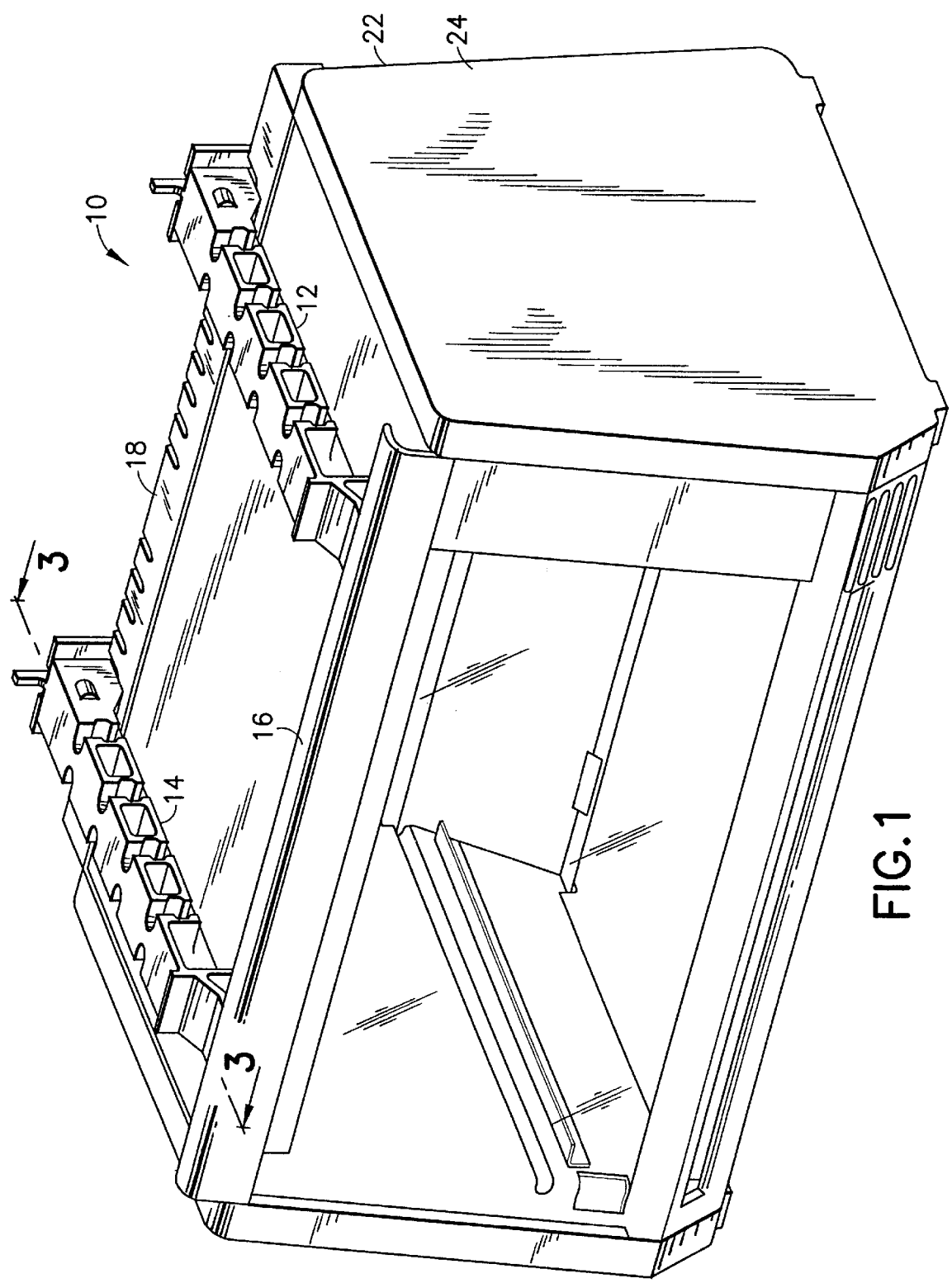
FIG. 1 a perspective view of two brackets of a mounting system comprising features of the present invention shown attached to a housing of a kitchen appliance.
Figure 2:
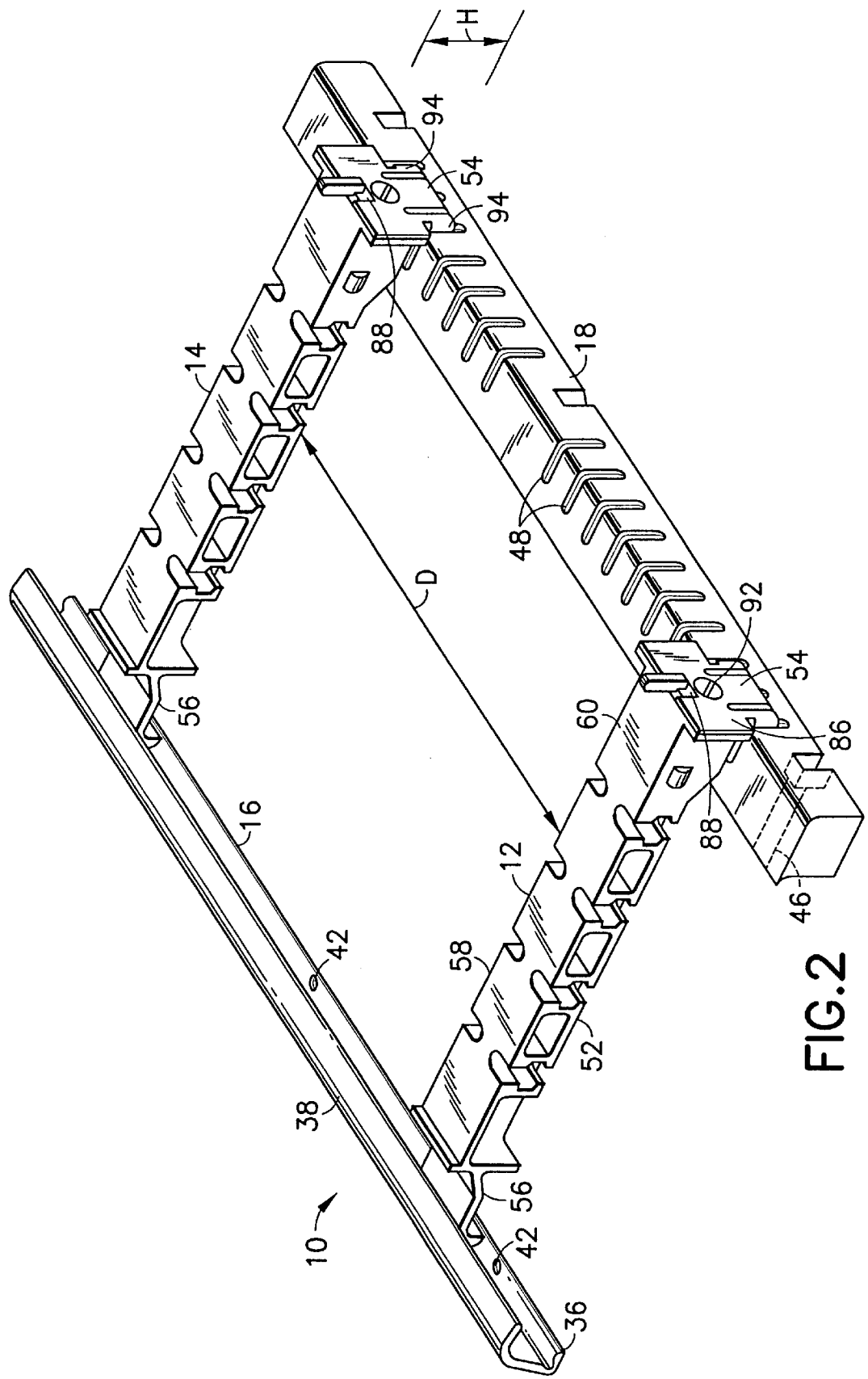
FIG. 2 is a top, rear and left side perspective view of the two brackets shown in FIG. 1 and front and rear mounting sections of the appliance.
Figure 3:
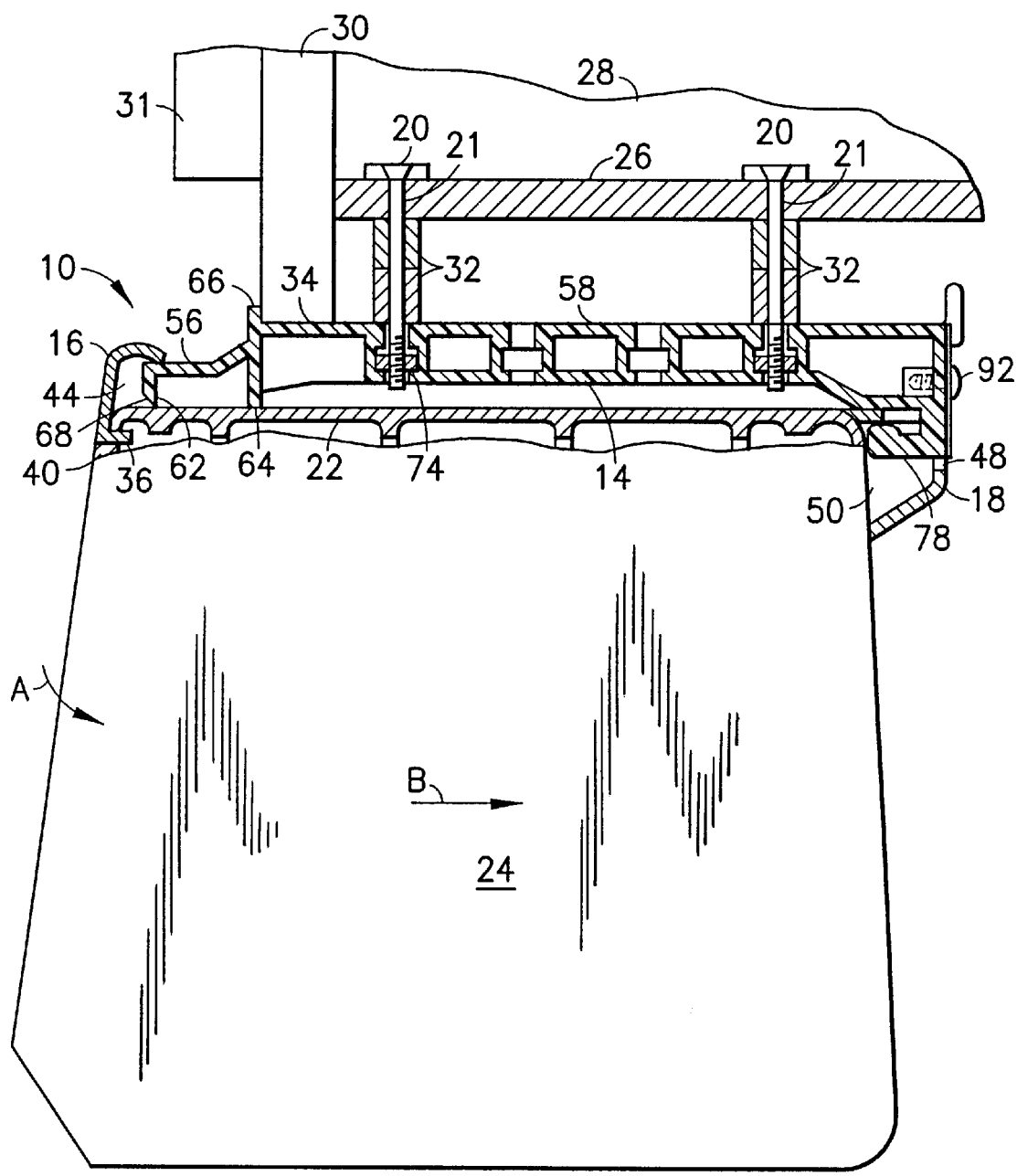
FIG. 3 is a partial cross-sectional view of the appliance and the mounting system with the brackets shown in FIG. 1 shown attached to a kitchen cabinet.

Referring to FIGS. 1–3, there is shown a mounting system 10 incorporating features of the present invention. Although the present invention will be described with reference to the embodiments shown in the drawings, it should be understood that the present invention can be embodied in many alternate forms of embodiments. In addition, any suitable size, shape or type of elements or materials could be used.

The mounting system 10 generally comprises two brackets 12, 14, two mounting sections 16, 18 and fasteners 20 (see FIG. 3). The two mounting sections 16, 18 are preferably fixedly connected to the housing 22 of an appliance 24. The appliance 24 can be any suitable type of kitchen appliance, such as a toaster oven, a can opener, a coffee maker, a radio, a television, or any other suitable appliance. As seen in FIG. 3, the mounting system 10 is designed to mount or hang the appliance from the bottom surface 26 of a kitchen cabinet 28. Kitchen cabinets often have a front face 30 which extends down below the bottom surface 26 and a door 31. Thus, spacers 32 can be used to space the bracket 12, 14 from the bottom surface 26 such that the brackets 12, 14 can be substantially horizontal and contact the bottom edge 34 of the front face 30.

The mounting sections 16, 18 are preferably sold as parts of the appliance 24 pre-assembled to the housing 22, but could be separate parts (perhaps sold as a kit with the brackets 12, 14) which are attached to the appliance 24 by the customer. In alternate embodiments the mounting system could have more or less than two mounting sections or, one or more of the mounting sections could be integrally formed with the housing 22. The front mounting section 16 is fixedly and stationarily mounted to the front top end of the housing 22. The front mounting section 16 is preferably a one-piece metal member, but could be comprised of any suitable material or combination of materials and, could be comprised of more than one member. The front mounting section 16 comprises a bottom mounting portion 36 and a top mounting portion 38. The bottom mounting portion 36 is used to connect the front mounting section 16 to the housing 22, such as extending into slot 40 and being fixedly attached by fasteners, such as screws or rivets (not shown) in holes 42. The top mounting portion 38 has a general hook shape. The top surface of the housing 22 and the top mounting portion 38 form a receiving area 44 therebetween with entry into the receiving area 44 being obtained from a rearward direction. However, in alternate embodiments, other shapes or configurations of the front mounting section 16 could be provided.

The rear mounting section 18 is fixedly and stationarily mounted to the rear top end of the housing 22. The rear mounting section 18 is preferably a one-piece molded plastic member, but could be comprised of any suitable material or combination of materials and, could be comprised of more than one member. The rear mounting section 18 comprises holes 46. Fasteners (not shown) can extend through the holes 46 to fixedly attach the rear mounting section 18 to the housing 22. However, any suitable attachment system could be used. For example, the rear mounting section 18 could be snap-lock mounted to the housing 22 by the customer. The rear mounting section 18 includes slots 48 into a hollow interior 50 of the rear mounting section 18. In this embodiment the slots 48 extend through the top and rear sides of the rear mounting section 18 at the corner. However, in an alternate embodiment the slots could merely extend through the top side or the rear side, or perhaps even a bottom side of the rear mounting section. The mounting sections 16, 18 could also be attached to intermediate locations on the top side of the housing 22; not just merely at the front and rear ends of the housing.

Figure 4:
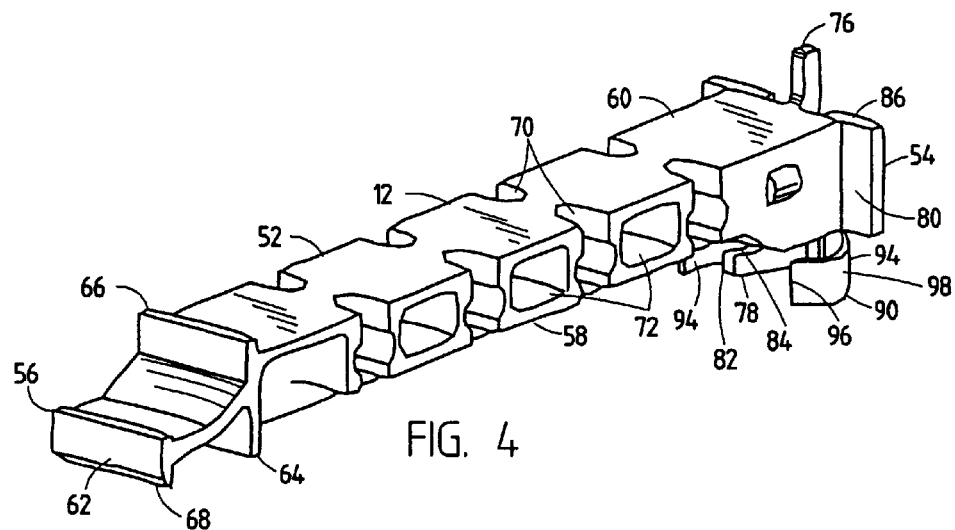
FIG. 4 is a perspective view of one of the brackets shown in FIG. 1.

Referring also to FIG. 4, the brackets 12, 14 are preferably the same, but could be different. In addition, the mounting system 10 could include more or less than two brackets. In this embodiment the brackets 12, 14 each comprise a frame piece 52 and a rear end connector 54. The frame piece 52 is preferably comprised of molded plastic as a one-piece member. However, any suitable material or combination of materials could be used. The frame piece 52 generally comprises a front section 56, a middle section 58 and a rear section 60. The front section 52 forms a front end connector 62, a bottom surface 64 and a stop 66. The front end connector 62 is sized and shaped to be inserted into the receiving area 44 between the top mounting portion 38 of the front mounting section 16 and the top side of the housing 22. The top mounting portion 38 can outwardly deflect as the front end connector 62 is inserted into the receiving area 44. The front end connector 62 can, thus, be fixedly captured between the front mounting section 16 and the top surface of the housing 22 with the front mounting section 16 providing a biasing force to bias the bottom surface 64 of the front end connector 62 against the housing 22. The stop 66 can interact with the front of the front face 30 of the cabinet 28 to locate the bracket relative to the front face of the cabinet. The bottom 68 of the front end connector 62 can have a sloped shape to assist in wedging the connector 62 into receiving area 44. In a preferred method of assembly with the brackets 12, 14 attached to the cabinet, the top end of the connector 62 is located in the receiving area 44 and the appliance 24 is rotated upward as indicated by arrow A (see FIG. 3) with the connector 62 wedging into the receiving area 44.

The middle section 58 of the frame piece 52 generally comprises slots 70 into lateral sides and through-holes 72. The slots 70 form receiving areas for receiving portions of the fasteners 20 and for holding nuts 74 help to form the middle section 58 as a structurally rigid member of light weight. Multiple slots 70 are provided to allow the installer the ability to locate the fasteners 20 at different ones of the slots for easier attachment to the cabinet. However, the middle section could have any suitable structural configuration or configurations to connect with the fasteners.

The rear section 60 generally comprises a top post 76, a bottom post 78 and lateral side mounts 80. The top post 76 is provided as an electrical cord wrap post such that an electrical cord from the appliance 24 can be wrapped onto the post 76 to prevent the cord from dangling below the appliance. However, the post 76 need not be provided. The bottom post 78 forms a guide for connecting the bracket with the rear mounting section 18. The bottom post 78 extends downward and forward in a general cantilever fashion. A space 82 is formed between the top side 84 of the bottom post 78 and the bottom of the rest of the rear section 60. The top side 84 forms a support surface for supporting the rear mounting section 18 thereon. However, any suitable type or shape of guide and/or support could be provided. The lateral side mounts 80 are for fixedly attaching the rear end connector 54 to the rear section 60. However, in alternate embodiments the lateral side mounts 80 need not be provided.

The rear end connector 54 is preferably a one-piece metal member. However, any suitable material or combination of materials could be used and the rear end connector could be a multipiece member. The connector 54 generally comprises a back section 86, and a bottom section 90. The back section 86 is connected to the rear end of the rear section 60 by a fastener 92. However, any suitable means could be used to connect the rear end connector 54 to the frame piece 52. Alternatively, the rear end connector could be formed integrally with the frame piece. A section 88 of the rear section 60 can project into an aperture in the rear end connector 54 to help prevent the connector 84 from axially rotating about the screw 92. The bottom section 90 generally comprises two spring sections 94. The spring sections 94 extend in general cantilever fashion from the back section 86. The spring sections 94 are located on opposite lateral sides of the guide/support post 78 with spaces therebetween. The spring sections 94 have a general outwardly bowed shape with front ends 96 that are located closer to each other than middle sections 98. However, any suitable shape of spring section could be provided and the connector could have more or less than two spring sections.

The guide/support post 78 and the spring sections 94 are sized, shaped and located relative to each other to be inserted into three of the slots 48 of the rear mounting section 18. More specifically, after the front end connector 62 is located in the receiving area 44 (with the rear end of the appliance being swung up as indicated by arrow A in FIG. 3), the appliance is moved rearward as indicated by arrow B. The guide post 78 extends into one of the slots 48 to help the front ends 96 of the spring sections 94 be positioned at adjacent slots. With further rearward movement of the appliance 24, the spring sections 94 are resiliently deflected towards each other and then snap back as the rear end of the rear mounting section 18 passes the middle sections 98 of the spring sections 94 to snap-lock mount the connector 54 to the rear mounting section 18. The top edges of the spring sections 94 can also help support the rear mounting sections 18 thereon.

One of the advantages of the present invention is that the mounting sections 16, 18 and brackets 12, 14 can be connected to each other at any one of a number of different relative positions. This feature is provided by the ability of the front end connectors 56 to be positioned in any suitable location along the width of the receiving area 44 and, by the ability of the rear end connectors 54 to be positioned in any suitable sets of the multiple slots 48 along the rear mounting section 18. Another advantage of the present invention is that the bracket 12, 14 can have any suitable distance or spacing D therebetween. This allows the space D to be varied based upon such things as the size of the appliance and/or the cabinet construction. For example, the brackets 12, 14 might be closer together for a can opener and further apart for a toaster oven. As another example, the spacing D can be selected when the mounting system bridges the joint between two cabinet units. This was not available in to prior art which attached to the lateral sides of the appliances. Because of the multiple slots 70 and the ability to vary the spacing distance D between the brackets 12, 14, the present invention can allow the user to use pre-existing holes through the bottom surface 26 of the cabinet 28 and/or drill new ones of the holes 21 for the fasteners 20, such as with a template (not shown). The present invention also allows the same brackets 12, 14 to be used with multiple different products and/or sizes of products such that multiple different bracket bracket designs (and tooling to manufacture such multiple different brackets) for a plurality of products is no longer necessary. The mounting system of the present invention does not substantially obstruct the style of appliance as in the prior art lateral side mounting systems. The low profile or low height H of the bracket system of the present invention is virtually unseen by the consumer.

Figure 5:
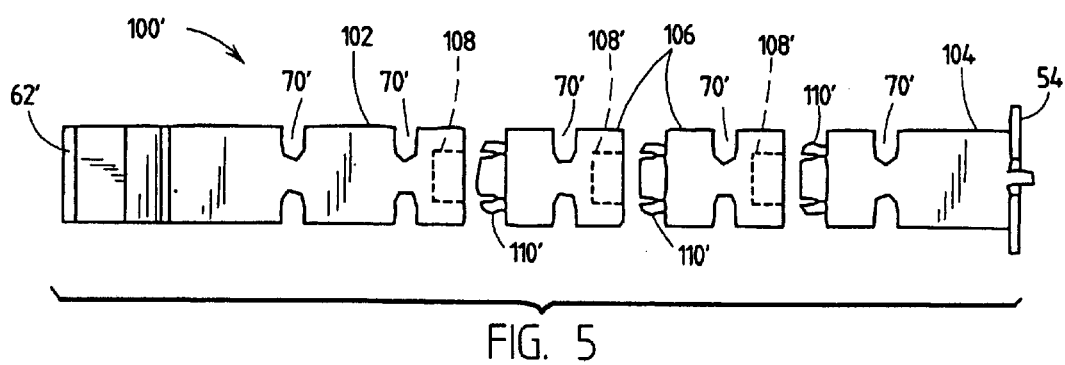
FIG. 5 is an exploded top plan view of an alternate embodiment the bracket.

Referring now to FIG. 5, an alternate embodiment of the present invention is shown. In this embodiment the bracket 100 generally comprises a first front section 102, a second rear section 104, and optional third sections 106. The front section 102 comprises the front end connector 62', slots 70' and a snap-lock receiving area 108. The rear section 104 comprises rear end connector 54', slots 70' and a snap-lock latching section 110. The third sections 106 each generally comprise slots 70', snap-lock receiving area 108' and snap-lock latching section 110'. With this embodiment the length of the bracket 100 can be modularly configured or selected based upon the product intended to be hung. The front and rear sections 102, 104 can be rigidly directly connected to each other with snap-lock latching section 110 extending into area 108. Alternatively, one or more of the third sections 106 can be snap-lock connected between the front and rear sections 102, 104 for longer length bracket configurations. In alternate embodiments any suitable system for connecting the members 102, 104, 106 to each other could be used.

Figure 6:
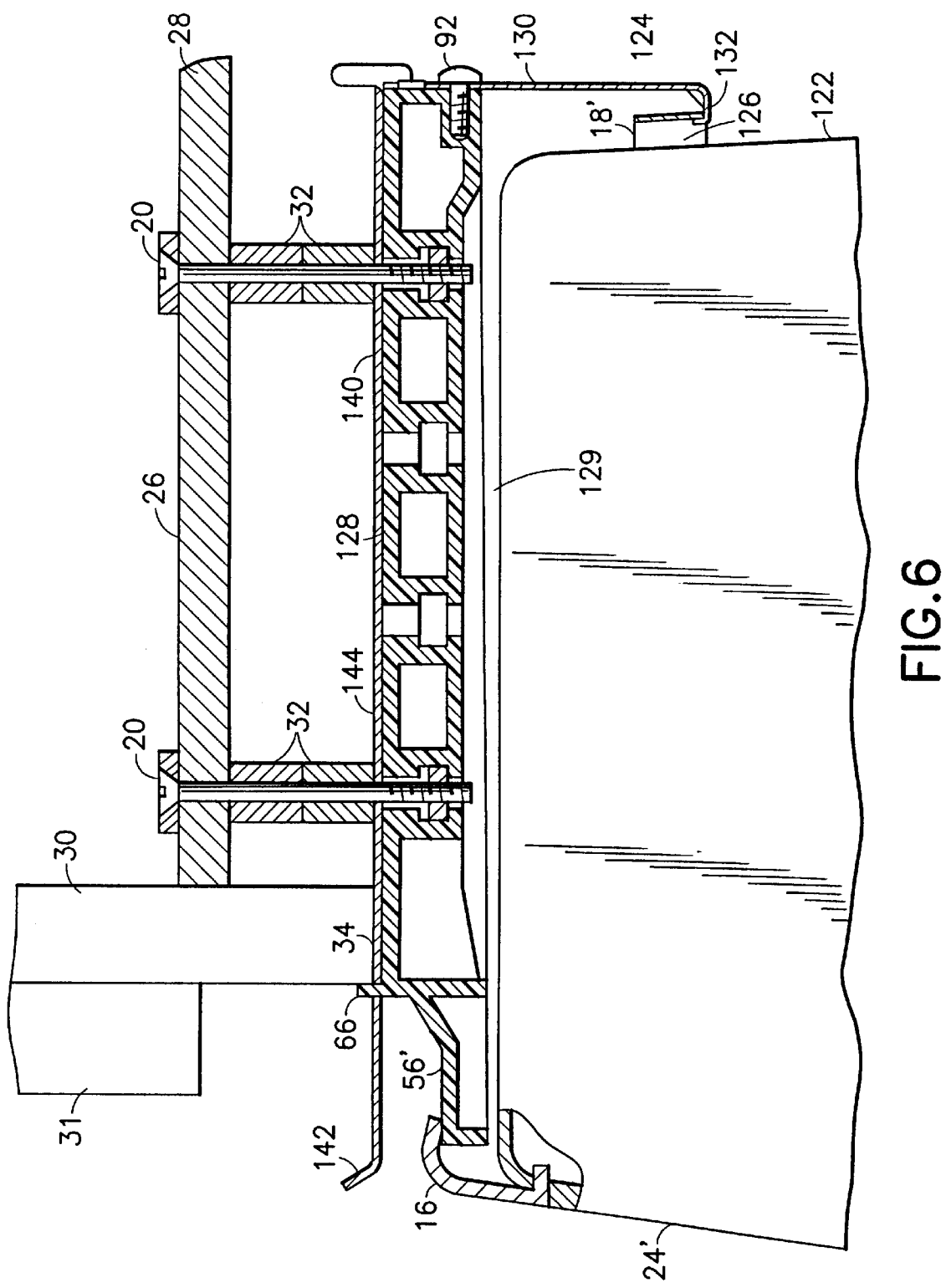
FIG. 6 a partial schematic cross-section view of an alternate embodiment of the present invention.
Figure 7:
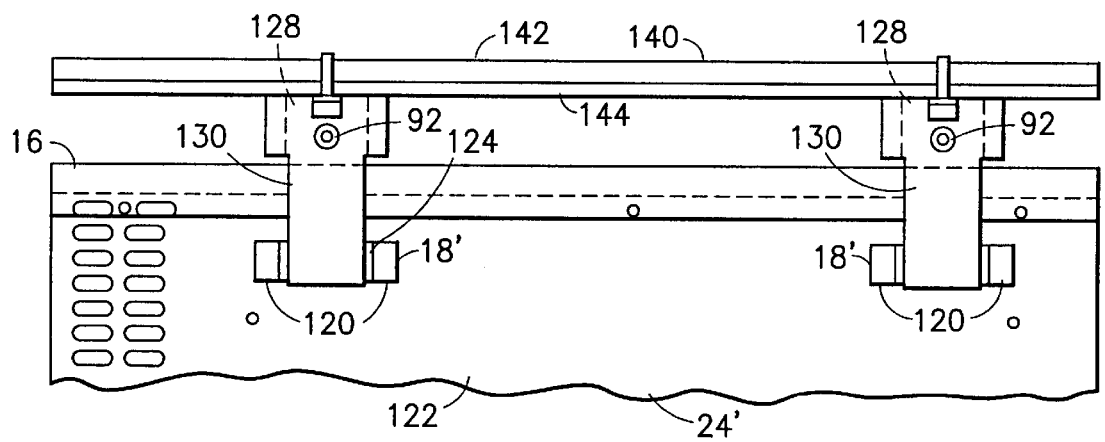
FIG. 7 is a partial rear end elevational view of the mounting system shown in FIG. 6.

Referring now to FIGS. 6 and 7 an alternate embodiment of the present invention will be described. In this embodiment the appliance 24' has the front mounting section 16 attached to it and two rear mounting sections 18'. The two rear mounting sections 18' preferably comprise metal brackets. The brackets 18' have ends 120 that are stationarily attached to the rear end 122 of the appliance's housing, such as by use of rivets or by welding. The brackets 18' also have a middle section 124 that is bent to form a space 126 between the middle section 124 and the rear end 122 of the appliance's housing. The brackets each generally comprise a frame piece 128 and a rear end connector 130. The frame piece 128 can be the same as the frame pieces 52 or 102/104/106 described above, but in this embodiment the frame piece 128 does not include the bottom post 78. In this embodiment the frame piece 128 tapers in height from front to rear. Each rear end connector 130 is preferably a sheet metal member attached to the frame piece 128 by a screw 92. The bottom of the rear end connector 130 comprises a hook section 132. The hook section 132 can extend under the middle section 124 of the bracket 18' and extend into the space 126. In this embodiment the mounting system also comprises a heat shield 140. The heat shield 140 is preferably comprised of a sheet metal member. The heat shield 140 is located on top of the frame pieces 128 and includes holes for the fasteners 20 and stop 66. Preferably, the heat shield is trapped between the frame pieces 128, spacers 32 and cabinet lip 34. The front 142 of the heat shield 140 is slightly turned up from the main body 144 of the rest of the heat shield. However, any suitable shape could be provided. In an alternate embodiment the heat shield could be integrally formed as a one-piece member with the rear end connectors 130. A predetermined space 129 can be provided between the frame pieces 128 and the top surface of the appliance. For connection of the appliance 24' to the mounting system, the rear end of the appliance would slide along the tapered bottom of the frame pieces 128 and then drop into the hook sections 132. While doing this, the front section 56' would be locked at the top front of the appliance at 16.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A system for connecting an appliance to a bottom surface of a kitchen cabinet, the system comprising:

at least two brackets connectable to the bottom surface of the kitchen cabinet, wherein the brackets are connectable to the bottom surface at any one of a number of different suitable spacing distances between the two brackets;

at least one mounting section for attachment to the appliance for mounting the appliance to the at least two brackets, wherein the at least one mounting section is adapted to connect to the at least two brackets when the brackets are at any one of the different suitable spacing distances; and said at least two brackets each comprise a rear end connector comprising at least one resiliently deflectable spring section for snap-lock connecting the rear end connector to the at least one mounting section.

2. A system as in claim 1 wherein the at least one mounting section comprises a top rear end mounting section having multiple mounting slots therethrough.

3. A system as in claim 1 wherein the at least one mounting section comprises a top front end mounting section having an elongate receiving slot for receiving front ends of the brackets.

4. A system as in claim 3 wherein the at least one mounting section comprises a top rear end mounting section having multiple mounting slots therethrough.

5. A system as in claim 1 wherein the at least two brackets are separately and independently connectable to the bottom surface of the kitchen cabinet.

6. A system as in claim 1 wherein each rear end connector comprises two of the spring sections.

7. A system as in claim 6 wherein the two spring sections resiliently deflect in opposite directions when the rear end connector is connected to the mounting section.

8. A system as in claim 7 wherein each rear end connector further comprises a guide extending between the two spring sections, wherein the guide is positionable into the mounting section to guide the spring sections into the mounting section.

9. A system as in claim 1 wherein the at least two brackets each comprise a front end connector comprising a projection for projecting into a receiving slot in a second one of the mounting sections.

10. A system as in claim 1 wherein at least one of the brackets comprises multiple modular pieces which are connected in series to each other, wherein a length of the at least one bracket can be selected based upon a selection of a suitable number of the modular pieces to be connected to each other.

11. A kitchen appliance mounting bracket comprising:

a first section for connecting the bracket to a kitchen cabinet;

a second section connected to the first section for connecting the bracket to an appliance, the second section comprising a locating system with two resiliently deflectable spring sections which are deflectable in opposite directions for snap-lock connecting the second section to the appliance; and the second section is located at a bottom rear end of the bracket wherein the bracket further comprises a third section at a front end of the bracket for connecting the bracket to a top end of the appliance.

12. A mounting bracket as in claim 11 wherein the first section comprises apertures in a middle section of the bracket for receiving portions of fasteners for connecting the first section to the kitchen cabinet.

13. A mounting bracket as in claim 11 wherein the locating system further comprises a projecting guide located between the two spring sections.

14. A mounting bracket as in claim 11 wherein the spring sections are deflectable in lateral directions.

15. A mounting bracket as in claim 11 wherein the bracket is comprised of modular frame pieces connected to each other in series, wherein a length of the bracket is configurable to a desired length.

16. A kitchen appliance mounting bracket comprising:
a first section for connecting the bracket to a first portion of an appliance;
a second section for connecting the bracket to a second portion of the appliance, wherein the first and second sections are directly connected to each other or the bracket alternatively comprises at least one third section connecting the first section to the second section, wherein a length of the bracket is configurable to a desired length; and
the first section comprises a receiving area and the second section comprises a snap-lock projection for projecting into the receiving area.

17. A mounting bracket as in claim 16 wherein each third section comprises a snap-lock projection at one end and a receiving area on an opposite end.

18. A mounting bracket as in claim 16 wherein each third section comprises an aperture for receiving a fastener.

19. A method of attaching an appliance to a mounting bracket comprising steps of:
connecting a first mounting section to a top rear section of the appliance;
connecting a second mounting section to a top front section of the appliance;
connecting a rear section of the bracket to the first mounting section comprising snap-lock connecting a portion of the rear section of the bracket to slots in the first mounting section; and
connecting a front section of the bracket to the second mounting section wherein the bracket separately supports the appliance via the first and second mounting sections at both the top front section and the top rear section of the appliance.

20. A method as in claim 19 further comprising connecting the rear section of the bracket directly to the front section of the bracket.

21. A method as in claim 19 further comprising connecting the front and rear sections of the bracket to each other by at least one intermediate modularly connectable frame piece.

22. A system for connecting an appliance to a bottom surface of a kitchen cabinet, the system comprising:
at least two brackets connectable to the bottom surface of the kitchen cabinet, each of the brackets include frame pieces which are tapered in height from front to rear;
a heat shield connected to the brackets; and
at least two mounting sections for attachment to the appliance for mounting the appliance to the at least two brackets.

23. A system as in claim 22 wherein the heat shield comprises a single member which forms at least one attachment section of the brackets for direct connection to at least one of the mounting sections.

24. A system as in claim 22 wherein the brackets comprise hook shaped attachment sections for projecting into a space formed by the mounting sections.

* * * * *